R. A. HANKINSON.
MOTOR VEHICLE.
APPLICATION FILED SEPT. 8, 1914.
1,247,674.
Patented Nov. 27, 1917.
2 SHEETS—SHEET 2.
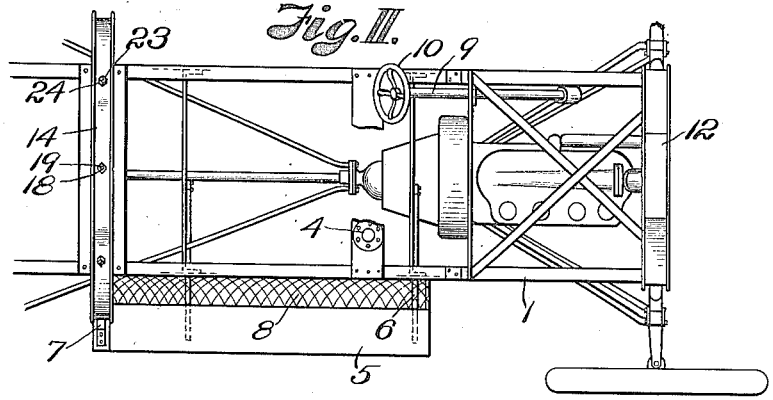
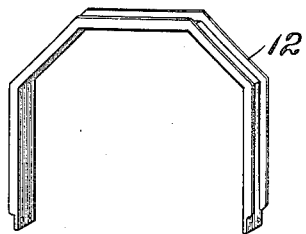
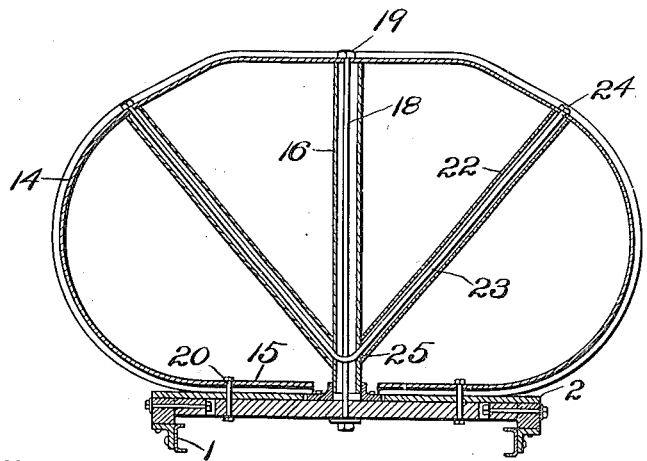
WITNESSES:
Arthur W. Capps.
Lynn A. Robinson.
INVENTOR
R. A. Hankinson.
BY
Arthur E. Brown
ATTORNEY

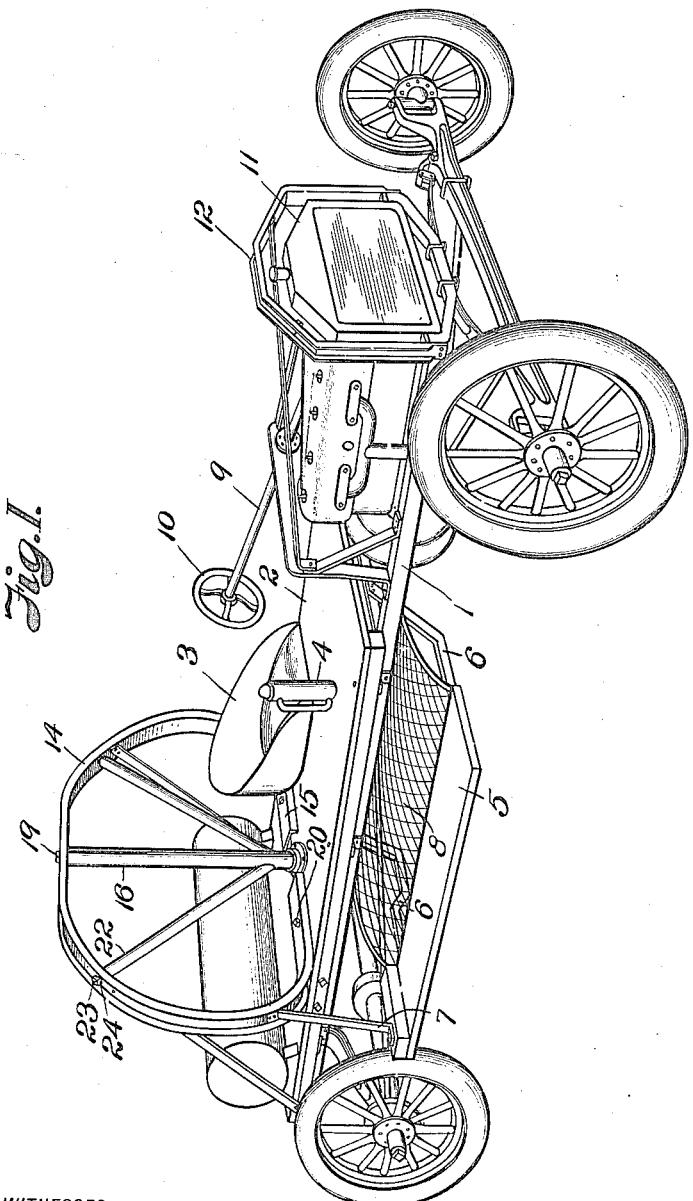

UNITED STATES PATENT OFFICE.

RALPH A. HANKINSON, OF DE SOTO, KANSAS.

MOTOR-VEHICLE.

1,247,674.　　　　　Specification of Letters Patent.　　Patented Nov. 27, 1917.

Application filed September 8, 1914. Serial No. 860,603.

*To all whom it may concern:*

Be it known that I, RALPH A. HANKINSON, a citizen of the United States, residing at De Soto, in the county of Johnson and State of Kansas, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to motor vehicles, and more particularly to a vehicle especially adapted for use in playing the game of "auto polo;" the principal object of the invention being to provide a brace or protecting frame which projects above the platform of a car sufficiently to protect the steering gear and driver when the car is overturned.

It is also an object of the invention to provide other improved details of structure; the preferred forms of which are illustrated in the accompanying drawings, wherein:—

Figure I is a perspective view of a motor vehicle containing my improvements.

Fig. II is a plan view of a portion of the same, with the platform removed.

Fig. III is a perspective view of the radiator guard.

Fig. IV is a central vertical section of the rear protecting frame, illustrating its mounting on the bed frame and its stiffening and bracing members.

Referring more in detail to the parts:—

1 designates the chassis of a motor vehicle, preferably of skeleton formation and mounted on the usual running gear.

Mounted on the chassis 1 is a platform 2, carrying a seat 3 and a hand-hold 4 for use by a player standing on a running-board 5 that is located at one side of the car, and is suspended by arms 6 that connect with the chassis and by a bracket 7 which is preferably connected with one of the upstanding brace or protecting frame members; the space between the inner edge of the foot-board and the adjacent end of the chassis being covered by a wire mesh 8, or the like, to keep the foot of the player from slipping from the foot-board to beneath the car.

The vehicle is provided with a motor of any suitable type, having a steering post 9 and a hand wheel 10, which latter is arranged adjacent the driver's seat. The motor has an ordinary radiator 11, and mounted on the chassis and extending over the radiator is a frame 12, preferably comprising a metal strip having sufficient strength and rigidity to support the weight of the car should the latter be overturned, and thereby protect the radiator and motor from damage by coming in contact with the ground.

Located back of the driver's seat, and preferably fixed to the platform 4, is a frame 14, which rises above the platform to such height that a line running from its upper edge to the upper edge of the forward frame 12 will overlie the driver and the steering gear, so that the car, when overturned, is supported on the frames 12 and 14, and the driver and steering gear fully protected.

It is also apparent that by locating the driver's seat low down on the platform the driver may remain in his seat in case the vehicle is overturned, and be protected by the frame members.

The rear frame 14 preferably comprises a stiff metal strip having curved sides and a flat top, with a base 15 bolted to the platform, and a central spacing member or stiffener 16.

The stiffener 16 preferably consists of a tubular member having its opposite ends engaging the inner faces of the top and base of the frame and which is held to the frame by an elongated bolt 18 that extends through the tube and has head and nut members 19 bearing against the top of the frame and the under portion of the platform respectively.

Bolts 20 are also preferably extended through the bottom of the frame and through the platform to rigidly secure the frame in place.

To further stiffen and brace the frame, I provide the same with additional tubular members 22 which extend diagonally from the lower portion of the stiffener 16 to upper corners of the frame, with the ends of said members bearing against the frame and stiffener 16 respectively; the auxiliary stiffeners being held in place by a V-shaped bolt 23, which extends through the tubular members 22 and has head and nut members 24 at its opposite ends bearing against the outer face of the frame; the central portion of the bolt being extended through apertures 25 in the central stiffener so that all of the parts are connected by the single bolt member.

In using the device, presuming the parts to be constructed and assembled as described, the driver sits on the platform and operates the car while a player stands on the foot-board in readiness to strike the ball when the car is brought adjacent thereto; the player holding to the hand-hold 4 and leaning from the platform when necessary; the wire mesh forming a stop to hold his feet to the platform and prevent him from slipping from the foot-board to beneath the car.

If in making a sharp turn, or from any other reason, the car should be overturned, it is supported on the front and rear frame members so that the shock or weight of the car will not be thrown onto the radiator or steering gear; thereby not only protecting the mechanism of the car but also protecting the driver in case of such an accident.

Having thus described my invention, what I claim as new therein, and desire to secure by Letters Patent, is:

The combination with a motor vehicle comprising a bed frame, of a protecting frame of skeleton construction mounted on the bed frame, a stiffener within the protecting frame, brace members mounted on the stiffener and extending diagonally therefrom to radial portions of the protecting frame, and a V-bolt extending through the stiffener, the braces and radial portions of the protecting frame and secured thereto, for the purpose set forth.

In testimony whereof I affix my signature in presence of two witnesses.

RALPH A. HANKINSON.

Witnesses:
 LYNN A. ROBINSON,
 LETA E. COATES.